United States Patent
Apilado

(10) Patent No.: US 11,524,622 B1
(45) Date of Patent: Dec. 13, 2022

(54) BRACKET FOR MOUNTING LIGHT TO STEERING ARM

(71) Applicant: Alexander Nathanel Apilado, Tracy, CA (US)

(72) Inventor: Alexander Nathanel Apilado, Tracy, CA (US)

( * ) Notice: Subject to any disclaimer, the term of this patent is extended or adjusted under 35 U.S.C. 154(b) by 0 days.

(21) Appl. No.: 17/571,276

(22) Filed: Jan. 7, 2022

Related U.S. Application Data

(63) Continuation-in-part of application No. 17/188,926, filed on Mar. 1, 2021, now Pat. No. 11,254,259.

(60) Provisional application No. 63/063,535, filed on Aug. 10, 2020.

(51) Int. Cl.
 *B60Q 1/04* (2006.01)
 *B60Q 1/26* (2006.01)
 *B60Q 1/12* (2006.01)
 *B60Q 1/124* (2006.01)
 *B60Q 1/18* (2006.01)

(52) U.S. Cl.
 CPC .............. *B60Q 1/0408* (2013.01); *B60Q 1/12* (2013.01); *B60Q 1/124* (2013.01); *B60Q 1/18* (2013.01); *B60Q 1/2661* (2013.01)

(58) Field of Classification Search
 CPC .... B60Q 1/048; B60Q 1/0483; B60Q 1/2661; B60Q 1/06; B60Q 1/124; B60Q 1/068; B60Q 1/18; B60Q 1/12; B60Q 1/0408; F21V 21/00
 USPC ..................................... 362/549, 37, 53, 46
 See application file for complete search history.

(56) References Cited

U.S. PATENT DOCUMENTS

| | | | | |
|---|---|---|---|---|
| 1,611,392 A | * | 12/1926 | Thompson | B60Q 1/124 362/43 |
| 1,808,039 A | * | 6/1931 | Hunter | B60Q 1/124 362/53 |
| 4,442,477 A | * | 4/1984 | Hennessey | B60Q 1/18 362/52 |
| 11,254,259 B1 | * | 2/2022 | Apilado | B60Q 1/2661 |
| 2019/0300347 A1 | * | 10/2019 | Yoshioka | B60Q 1/18 |
| 2020/0062317 A1 | * | 2/2020 | Maier | B62D 25/186 |

* cited by examiner

*Primary Examiner* — Laura K Tso
(74) *Attorney, Agent, or Firm* — Plager Schack LLP; Mark H. Plager; Kara Verryt

(57) ABSTRACT

A light mount for mounting a light to a steering arm on an axle may include a bracket designed to attach to the steering arm, wherein the bracket and, thus, the light pod rotate with rotation of the steering arm. The bracket may include a mounting frame, wherein a first edge of the mounting frame is concavely curved and wherein a plurality of mounting orifices extend through the mounting frame; and a mounting plate extending substantially perpendicularly from an upper edge of the mounting frame, wherein the mounting plate has a mounting orifice extending therethrough, the mounting orifice being sized to accommodate a fastener extending from a light pod.

9 Claims, 8 Drawing Sheets

BRACKET FOR MOUNTING LIGHT TO STEERING ARM

RELATED APPLICATION

This application claims priority to and is a continuation-in-part application of U.S. Ser. No. 17/188,926 filed on Mar. 1, 2021, the entire contents of which is herein incorporated by reference.

BACKGROUND

The embodiments described herein relate generally to automotive accessories and, more particularly, to a bracket for mounting a light to a steering arm on an axle.

Most vehicles do not have lights that turn with the wheels, leading to nighttime visibility issues. While some high-end vehicles come standard with this feature, there is currently no aftermarket product that can be added to a vehicle with standard lights to allow the lights to turn with the wheels.

Therefore, what is needed is a bracket for mounting a light to a steering arm on an axle, allowing the light to turn with the turning of the steering wheel.

SUMMARY

Some embodiments of the present disclosure include a light mount for mounting a light to a steering arm on an axle. The light mount may include a bracket designed to attach to the steering arm, wherein the bracket and, thus, the light pod rotate with rotation of the steering arm. The bracket may include a mounting frame, wherein a first edge of the mounting frame is concavely curved and wherein a plurality of mounting orifices extends through the mounting frame; and a mounting plate extending substantially perpendicularly from an upper edge of the mounting frame, wherein the mounting plate has a mounting orifice extending therethrough, the mounting orifice being sized to accommodate a fastener extending from a light pod.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a light mounting bracket and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

By way of example, and referring to FIGS. 1-18, some embodiments of the invention include a light mount for mounting a light pod 22 to a steer arm, such as kingpin steering knuckle or steering knuckle 10, 80, 90, 100, 110, on an axle tube 16 in a vehicle, the light mount comprising a bracket attached, such as removably or permanently attached, to the steer arm or to the steering knuckle and to the light pod 22 such that the light pod 22 moves with the steer arm or steering knuckle.

Figure 1:
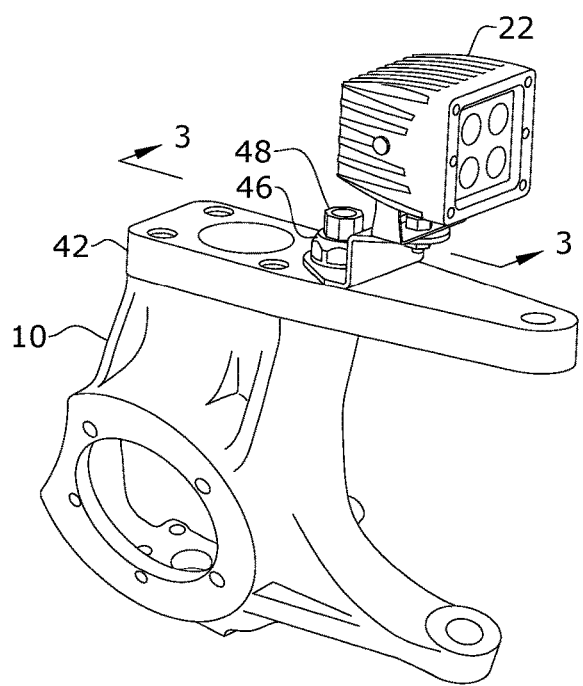
FIG. 1 is a perspective view of one embodiment of the present disclosure, shown in use.
Figure 2:
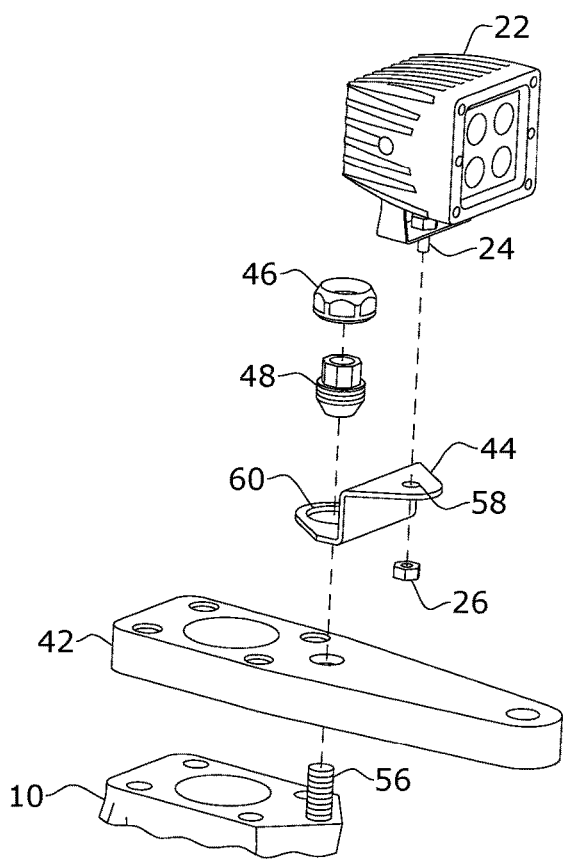
FIG. 2 is an exploded view of one embodiment of the present disclosure.
Figure 3:
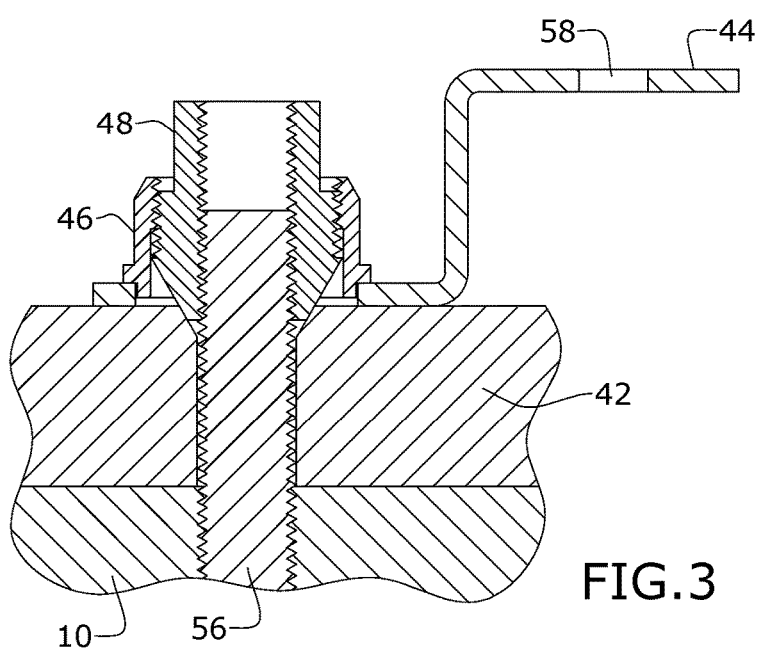
FIG. 3 is a section view of one embodiment of the present disclosure, taken along line 3-3 in FIG. 1.
Figure 4:
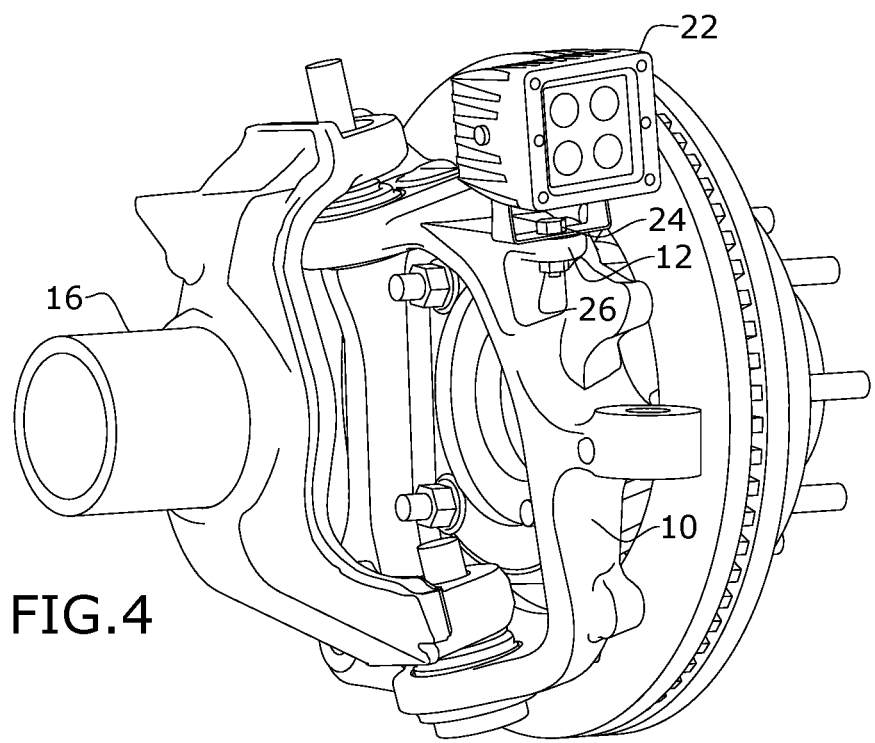
FIG. 4 is a perspective view of one embodiment of the present disclosure, shown in use.
Figure 5:
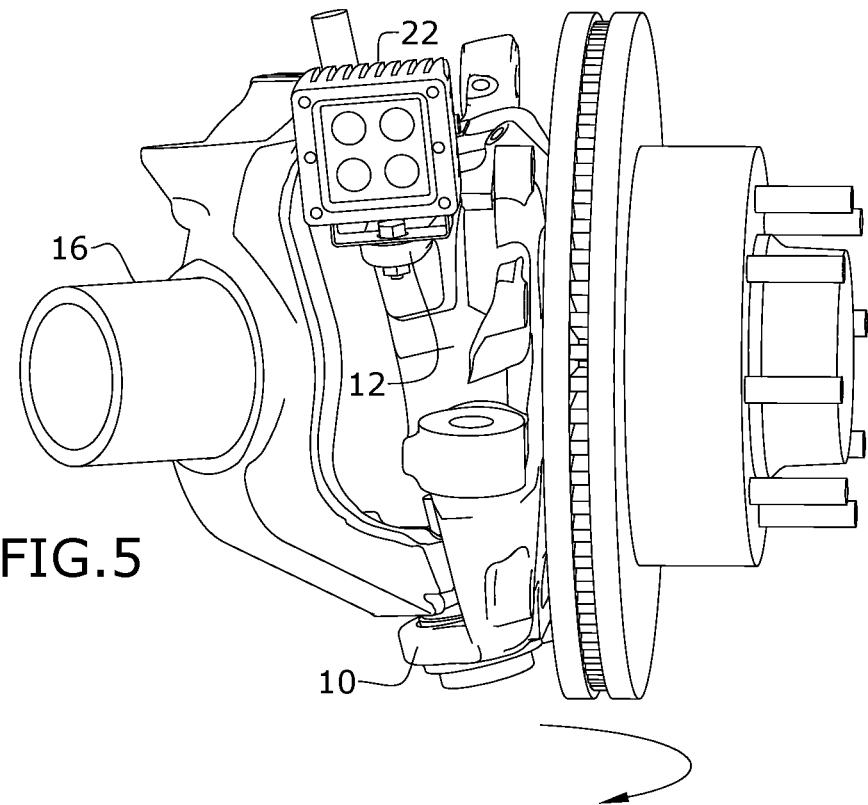
FIG. 5 is a perspective view of one embodiment of the present disclosure, shown in use.
Figure 6:
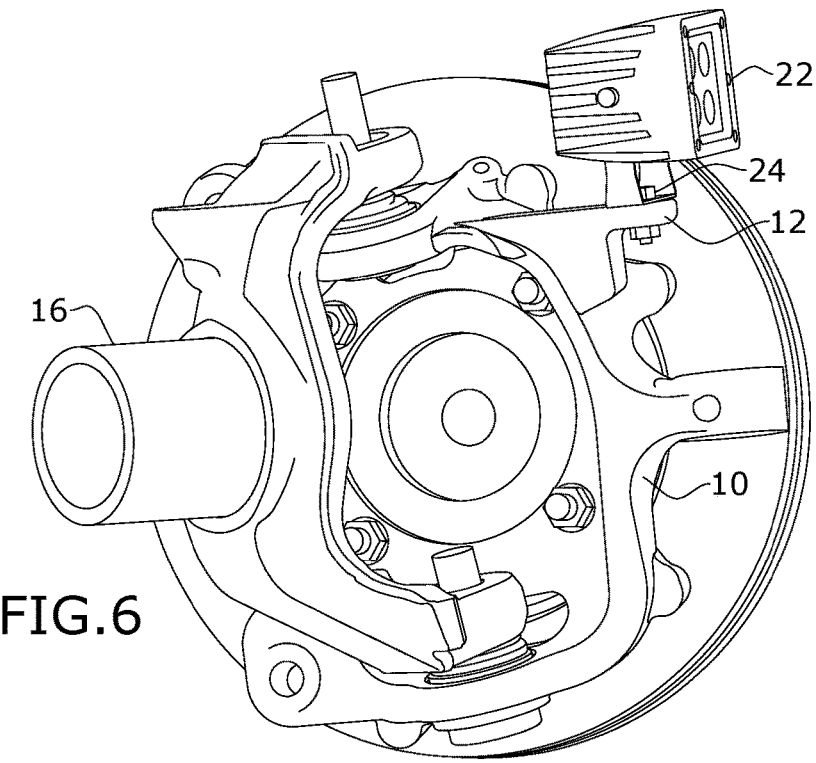
FIG. 6 is a perspective view of one embodiment of the present disclosure, shown in use.
Figure 7:
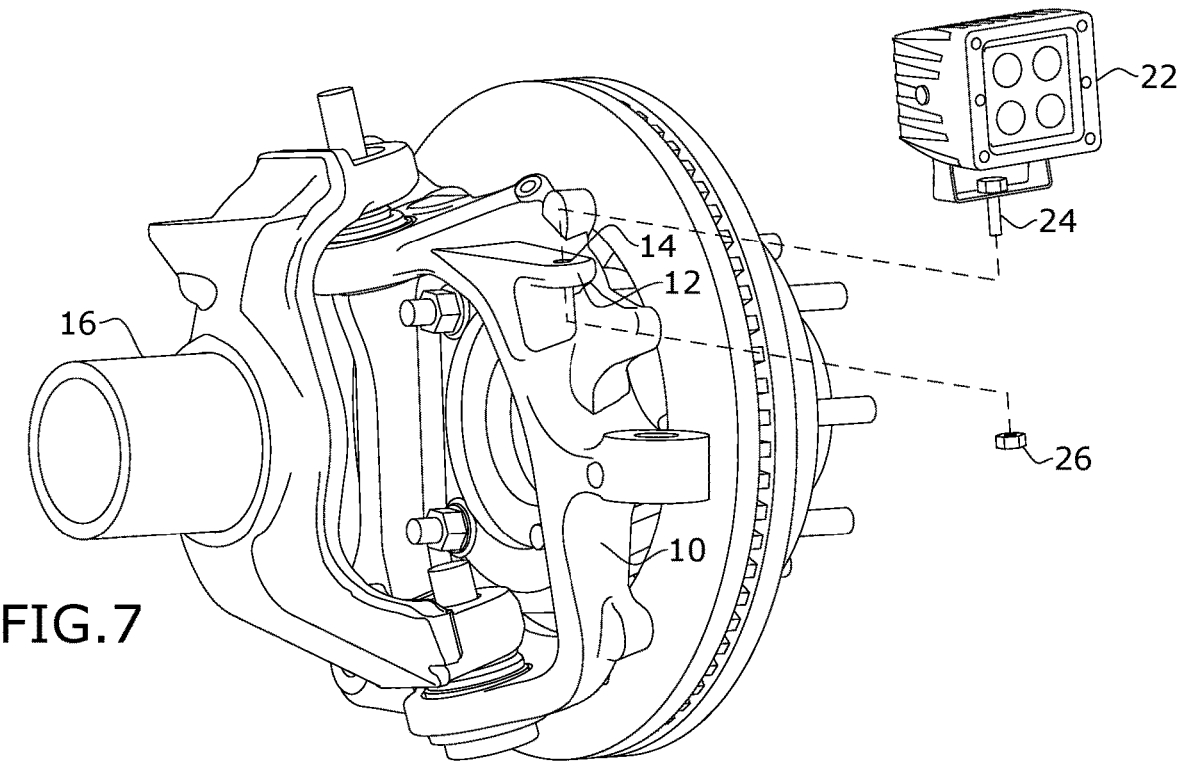
FIG. 7 is an exploded view of one embodiment of the present disclosure.

As shown in FIGS. 1-3, the bracket may comprise a Z-shaped bracket, wherein a first portion of the bracket is designed to be positioned flush to a kingpin mounting plate 42 on a kingpin steering knuckle, the first portion including a mounting plate stud orifice 60 extending there through, the mounting plate stud orifice 60 sized to accommodate a kingpin stud 56 and a fastener positioned therein. For example, as shown in FIG. 3, the king pin stud 56 may extend upwards from the kingpin mounting knuckle and the kingpin mounting plate 42 through the mounting plate stud orifice 60. An inner nut 48 with threaded interior walls may be engaged with the threads on the kingpin stud 56, and an outer nut 46 may engage with threads on the outer wall of the inner nut 48, thus securing the bracket to the kingpin mounting plate 42. As shown in the Figures, the inner nut 48 may comprise, for example, a tapered nut, such as a Chevy wheel nut, wherein the end of the inner nut 48 extending through the mounting plate stud orifice may have a taper off, for example, about 60 degrees, which may allow the inner nut 48 to seat fully into the steering knuckle or high steer components.

A second portion of the bracket may comprise a mounting plate 44, wherein the mounting plate 44 may be substantially parallel to and spaced from the first portion of the bracket, wherein the mounting plate 44 may comprise a mounting orifice 58 extending there through. The mounting orifice 58 may be sized to accommodate a fastener, such as a bolt 24, extending from the light pod 22, wherein the bolt 24 may be designed to engage with a mounting nut 26 on an opposite side of the mounting plate 44 from the light pod 22.

As shown in FIGS. 4-7, the bracket may comprise a mounting perch 12 integrated onto the steering knuckle 10. In other words, the bracket may be forged/cast/fabricated as part of the knuckle 10. As shown in the Figures, the mounting perch 12 may extend substantially outward from the outer surface of the knuckle 10. The mounting perch 12 may include a mounting orifice 14 extending there through, wherein the mounting orifice 14 is sized to accommodate the fastener, such as bolt 24, extending from the light pod 22, wherein a nut 26 may be used to engage with the bolt 24 to secure the light pod 22 to the mounting perch 12. Thus, in some embodiments, the device may comprise a newly designed steering knuckle with an incorporated or integrated mounting perch 12.

Figure 8:
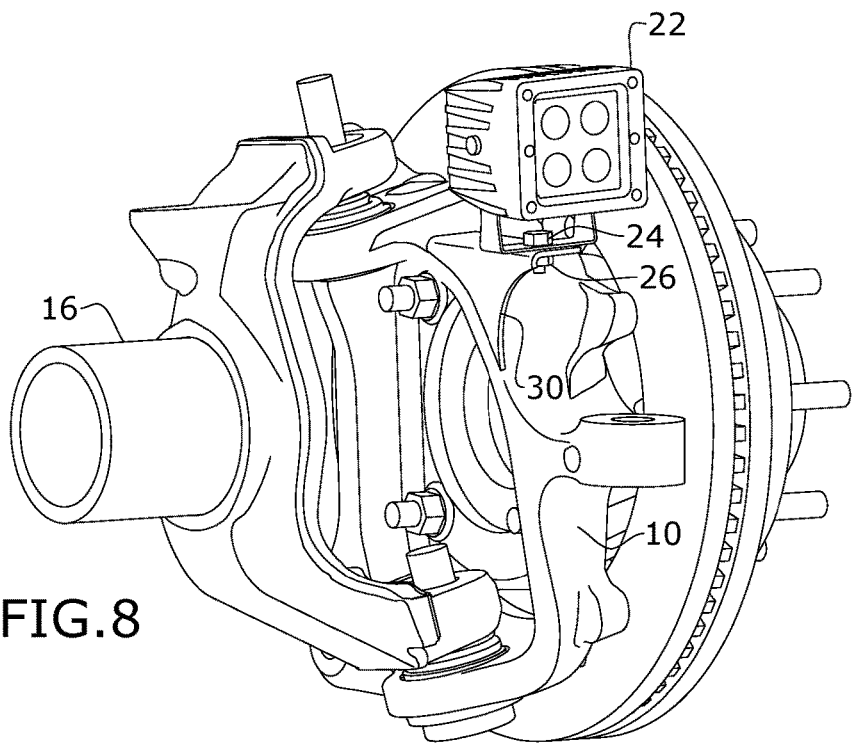
FIG. 8 is a perspective view of one embodiment of the present disclosure, shown in use.
Figure 9:
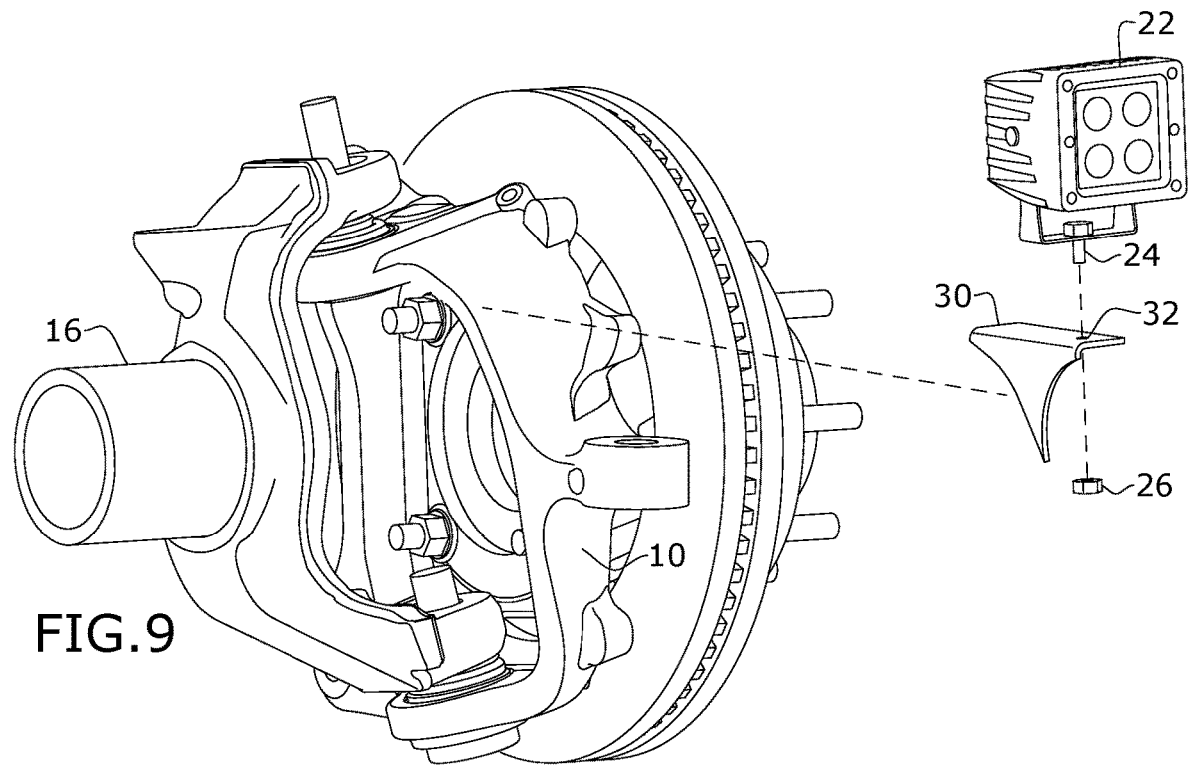
FIG. 9 is an exploded view of one embodiment of the present disclosure.

In yet a further embodiment, and as shown in FIGS. 8 and 9, the bracket may comprise a mounting plate designed to be attached, such as permanently attached, to an existing steering knuckle 10. For example, the bracket may comprise a weld-on plate 30 designed to be welded or otherwise securely attached to an outer surface of the steering knuckle 10. Thus, a first, inner edge of the weld-on plate 30 may mimic the shape of the outer surface of the steering knuckle 10, while the outer edge may extend outward from the steering knuckle, thus forming a mounting surface. The mounting surface of the weld-on plate 30 may include a mounting orifice 32 extending there through, wherein the mounting orifice 32 is sixed to accommodate the fastener, such as bolt 24, extending from the light pod 22, wherein a nut 26 may be used to engage with the bolt 24 to secure the light pod 22 to the weld-on plate 30. Thus, in some embodiments, the bracket may include an aftermarket part that may be added to an existing steering knuckle.

Figure 10:
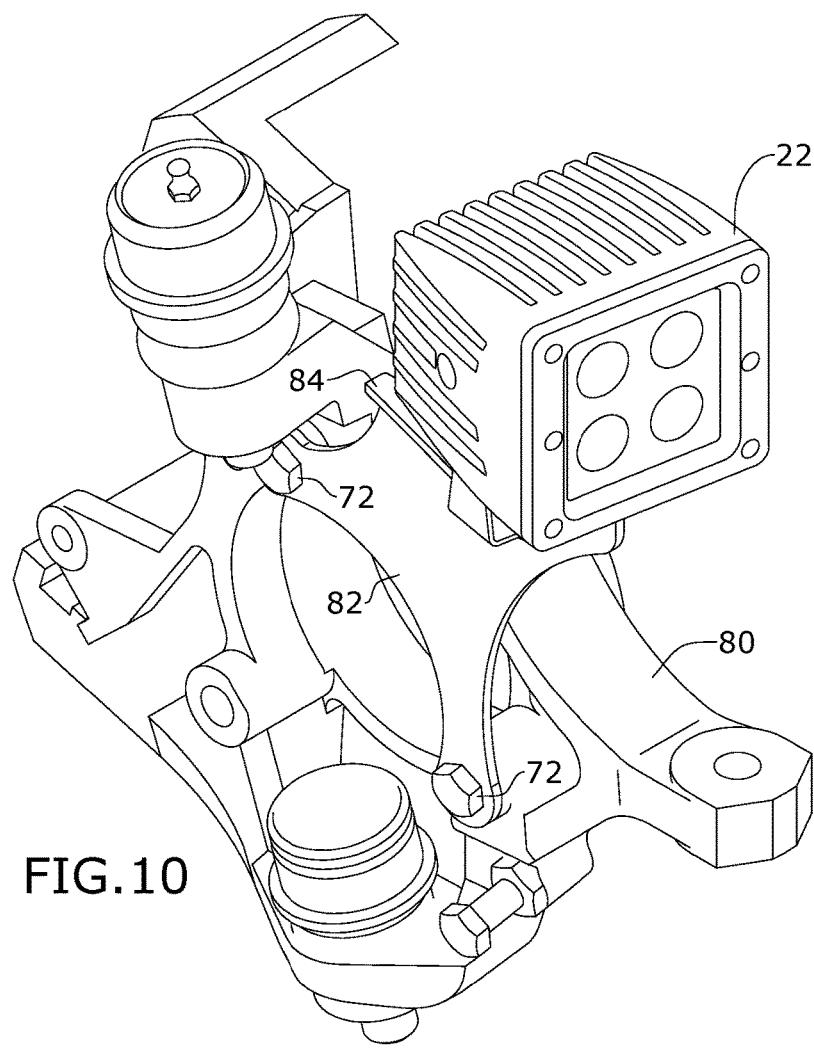
FIG. 10 is a perspective view of one embodiment of the present disclosure, shown in use.
Figure 11:
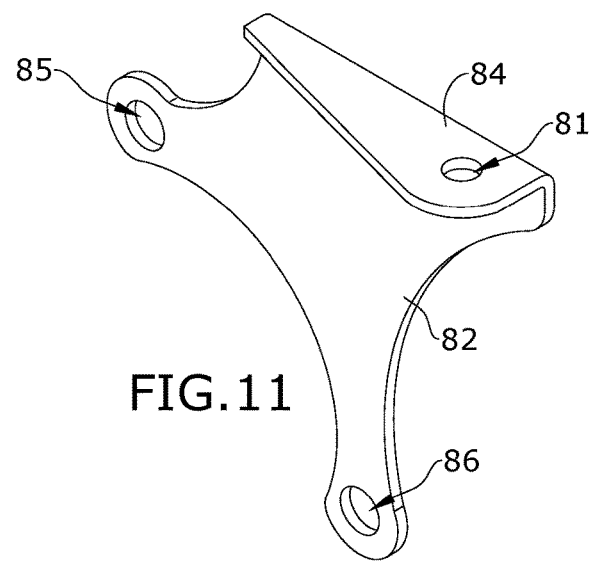
FIG. 11 is a side view of one embodiment of the present disclosure.

In another alternate embodiment, and as shown in FIGS. 10 and 11, the bracket may comprise a mounting frame 82 having a substantially planar shape, wherein one edge of the mounting frame 82 is curved to match the inner curvature of the steering knuckle 80 to avoid impeding functionality of the steering knuckle 80. More specifically, as shown in the Figures, the curved edge may be a concave curved edge with the curvature extending toward a central portion of the mounting frame 82. Each end of the curved edge may comprise a mounting orifice and, thus, a top end of the curved edge may have a rearward mounting orifice 85 extending therethrough and a bottom end of the curved edge may have a forward mounting orifice 86 extending therethrough. The bracket may further comprise a mounting plate 84 extending substantially perpendicularly outward from an outer edge of the mounting frame opposite the curved edge wherein the mounting plate 84 may have an upper mounting orifice 81 extending therethrough. The mounting plate 84 may taper from the widest width proximate to the forward edge of the mounting frame 82 and the smallest width proximate to the rear edge of the mounting frame 82. As shown in FIG. 10, the mounting frame 82 may be mounted to side surfaces of the steering knuckle 80 using fasteners 72 extending through the rearward mounting hole 85 and the forward mounting hole 86, and a light pod 22 may be mounted to the mounting plate 84 using a fastener extending through the upper mounting orifice 81. Because of its structure, the bracket shown in FIGS. 10 and 11 may be suitable for mounting to a JEEP brand TJ D44/D30 steering arm/knuckle. More specifically, the hub mounting bolt locations may be utilized to mount the bracket to the steering arm/knuckle.

Figures 12, 13:
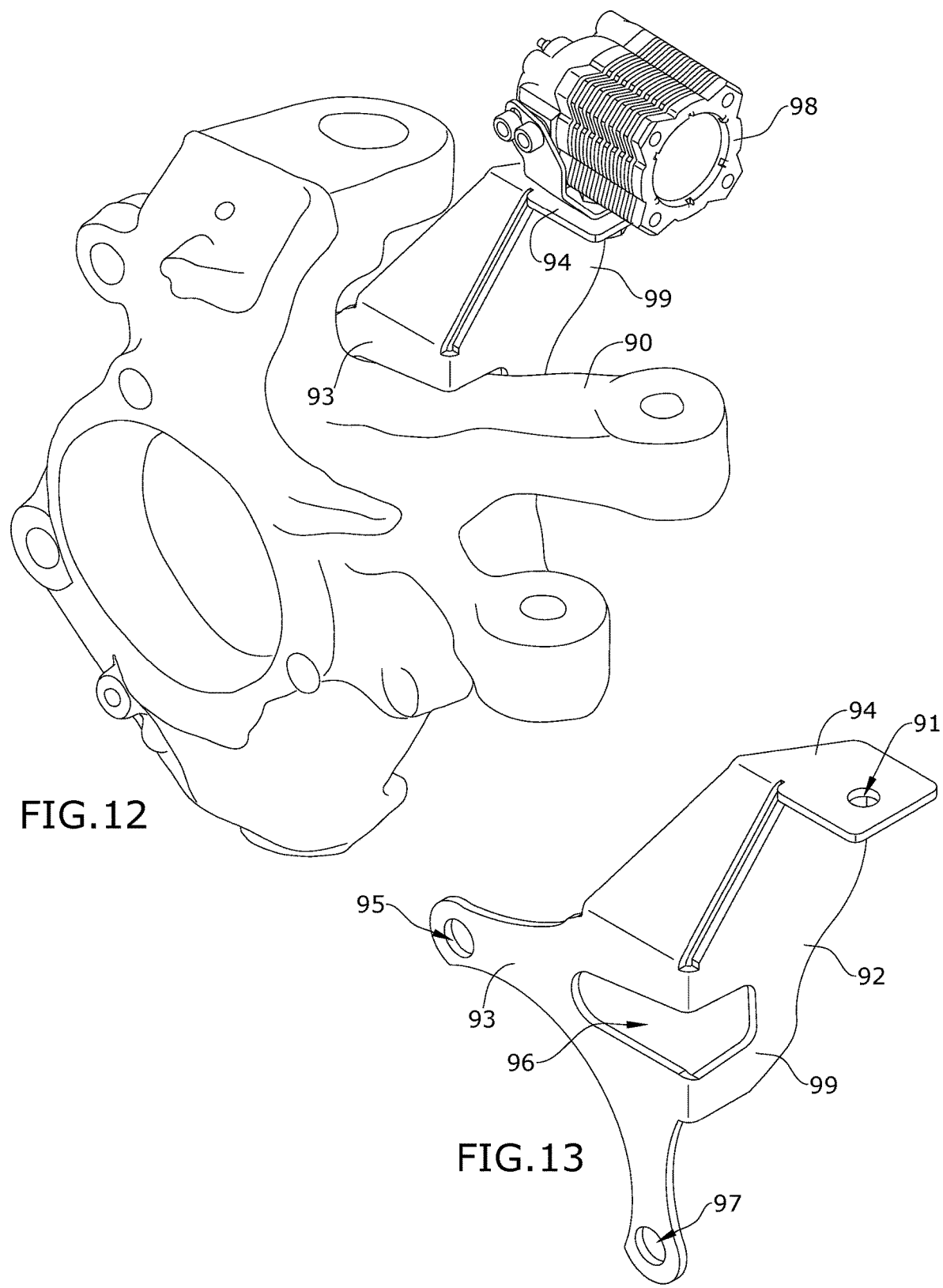
FIG. 12 is a perspective view of one embodiment of the present disclosure, shown in use.
FIG. 13 is a side view of one embodiment of the present disclosure.

As shown in FIGS. 12 and 13, a yet further embodiment of the bracket may comprise a mounting frame 92 having a first frame plate 93 that is substantially planar, wherein one edge of the first frame plate 93 is curved to match the inner curvature of the steering knuckle 90 to avoid impeding functionality of the steering knuckle 90, and a second frame plate 99 that extends substantially perpendicularly from a rearward edge of the first frame plate 93, wherein a frame cavity 96 extends through a portion of both the first frame plate 93 and the second frame plate 99 to provide for clearance of a protrusion extending from the steering knuckle 90, as shown in FIG. 12. More specifically, as shown in the Figures, the curved edge may be a concave curved edge with the curvature extending toward a central portion of the mounting frame 92. Each end of the curved edge may comprise a mounting orifice extending therethrough and, thus, a top end of the curved edge may have a forward mounting orifice 95 extending therethrough and a bottom end of the curved edge may have a rearward mounting orifice 97 extending therethrough. The bracket may further comprise a mounting plate 94 extending substantially perpendicularly outward from a top edge of the mounting frame 92. For example, the mounting plate 94 may extend perpendicularly outward from a top surface of the second frame plate 99, as shown in FIG. 13. The mounting plate 94 may be substantially trapezoidal shaped with an upper mounting orifice 91 extending therethrough. As shown in FIG. 12, the mounting frame 92, and specifically the first frame plate 93, may be mounted to side surfaces of the steering knuckle 90 using fasteners 72 extending through the rearward mounting orifice 95 and the forward mounting orifice 97, and a light pod 98 may be mounted to the mounting plate 94 using a fastener extending through the upper mounting orifice 91. Because of its structure, the bracket shown in FIGS. 12 and 13 may be suitable for mounting to a JEEP brand JL/Gladiator D44/D30 steering arm/knuckle. More specifically, the hub mounting bolt locations may be utilized to mount the bracket to the steering arm/knuckle.

Figure 14:
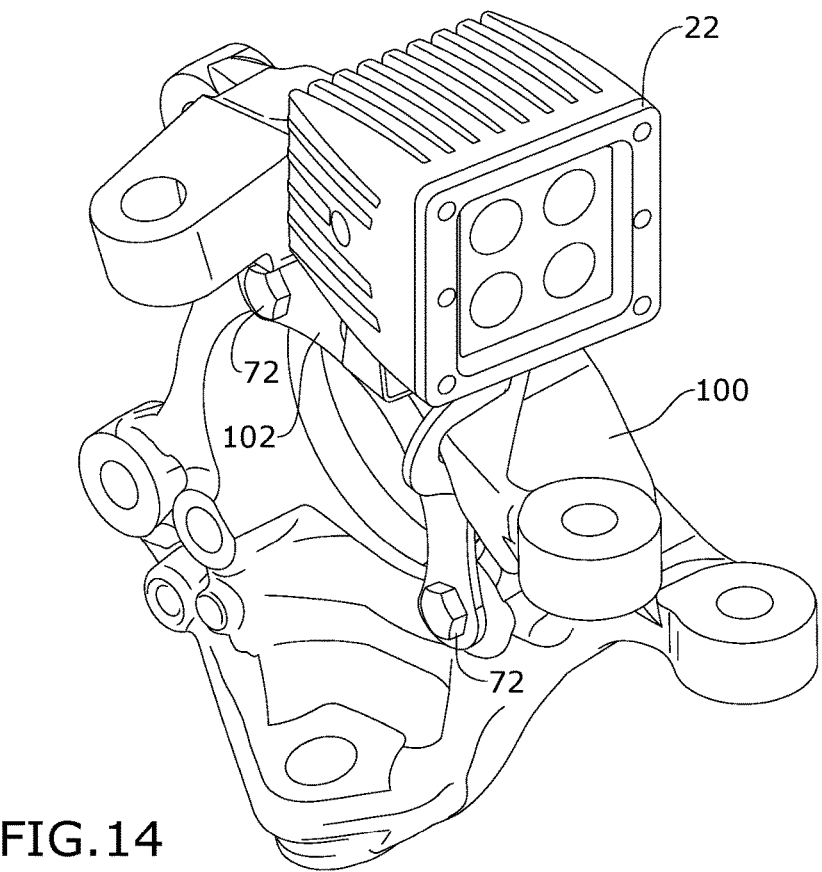
FIG. 14 is a perspective view of one embodiment of the present disclosure, shown in use.
Figure 15:
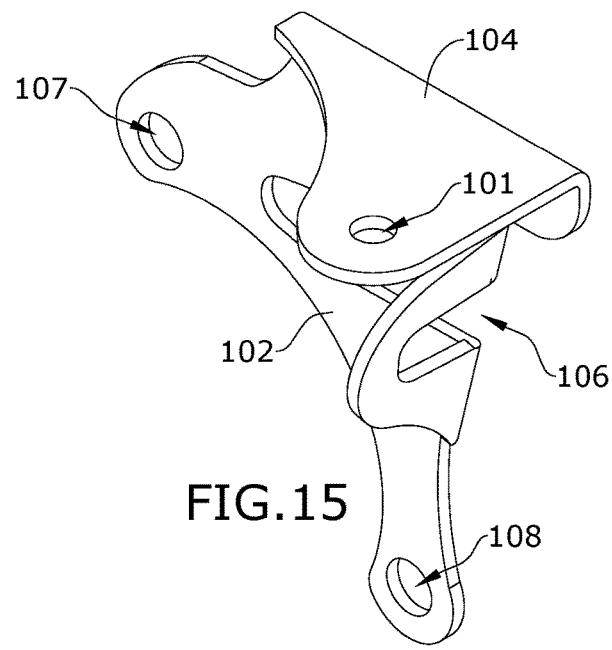
FIG. 15 is a side view of one embodiment of the present disclosure.

A yet further embodiment of the bracket is shown in FIGS. 14 and 15. As shown, the bracket may comprise a mounting frame 102 having a first frame plate that is substantially planar, wherein one edge of the first frame plate is curved to match the inner curvature of the steering knuckle 100 to avoid impeding functionality of the steering knuckle 100, and a second frame plate that extends substantially perpendicularly from a rearward edge of the first frame plate, wherein a frame cavity 106 extends through a portion of both the first frame plate and the second frame plate to provide for clearance of a protrusion extending from the steering knuckle 100 as shown in FIG. 14. As shown, the second frame plate may comprise a substantially ark-shaped plate. As shown in the Figures, the curved edge may be a concave curved edge with the curvature extending toward a central portion of the mounting frame 102. Each end of the curved edge may comprise a mounting orifice extending therethrough and, thus, a top end of the curved edge may have a forward mounting orifice 107 extending therethrough and a bottom end of the curved edge may have a rearward mounting orifice 108 extending therethrough. The bracket may further comprise a mounting plate 104 extending substantially perpendicularly outward from a top edge of the mounting frame 102. For example, the mounting plate 104 may extend perpendicularly outward from a top surface of the first frame plate, as shown in FIG. 15. The mounting plate 104 may taper from the widest width proximate to the rear edge of the mounting frame 102 and the smallest width proximate to the forward edge of the mounting frame 102 with an upper mounting orifice 101 extending therethrough. As shown in FIG. 14, the mounting frame 102, and specifically the first frame plate, may be mounted to side surfaces of the steering knuckle 100 using fasteners 72 extending through the forward mounting orifice 107 and the rearward mounting orifice 108, and a light pod 22 may be mounted to the mounting plate 104 using a fastener extending through the upper mounting orifice 101. Because of its structure, the bracket shown in FIGS. 14 and 15 may be suitable for mounting to a JEEP brand JK D44/D30 knuckle pod assembly. More specifically, the hub mounting bolt locations may be utilized to mount the bracket to the steering arm/knuckle.

Figure 16:
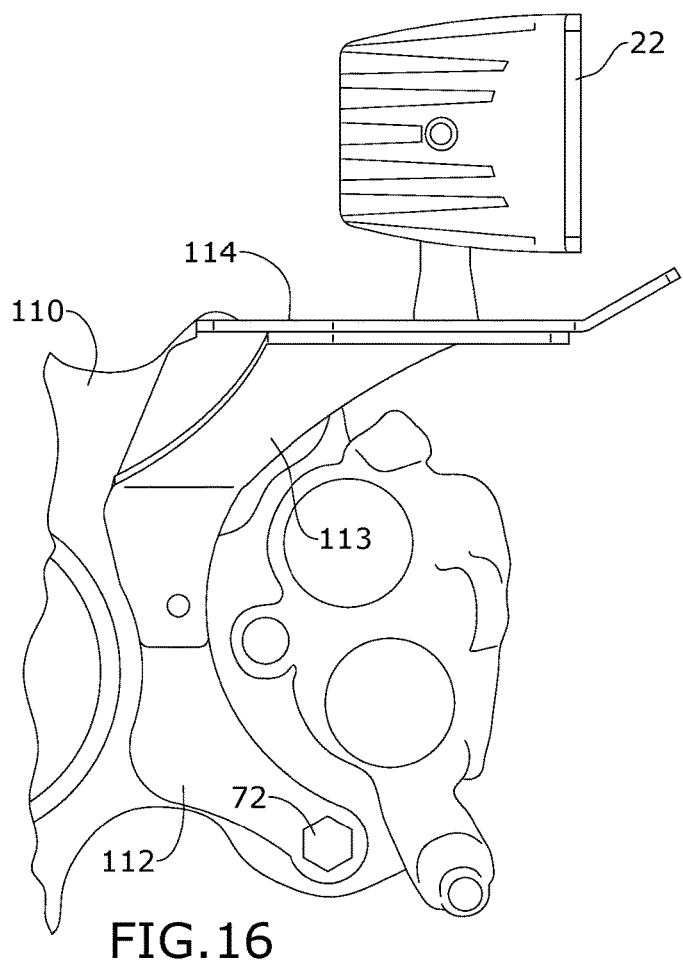
FIG. 16 is a side view of one embodiment of the present disclosure, shown in use.
Figure 17:
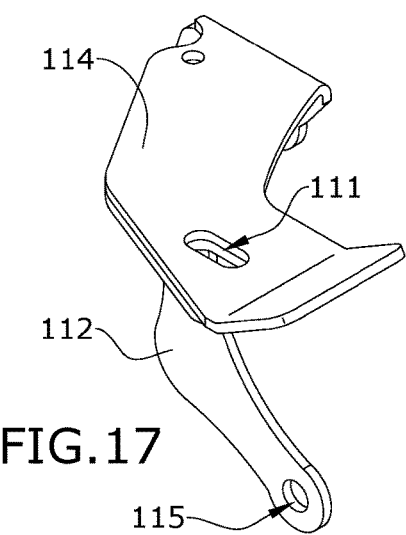
FIG. 17 is a perspective view of one embodiment of the present disclosure.
Figure 18:
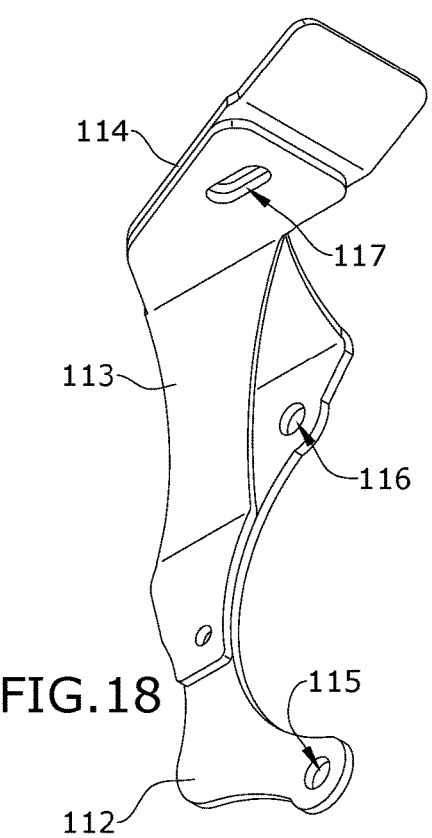
FIG. 18 is a bottom perspective view of one embodiment of the present disclosure.

Another embodiment of the bracket is shown in FIGS. 16-18. In this embodiment, the bracket may be mounted to a brake caliper, such as a CAN AM brand X3 brake caliper. As shown, the bracket may comprise a mounting frame 112 having a substantially planar shape, wherein one edge of the mounting frame 112 is curved to avoid impeding functionality of the brake caliper. More specifically, the curved edge may be a concave curved edge with the curvature extending toward a central portion of the mounting frame 112. As show in the Figures, the curved edge may be substantially semicircular in shape. Each end of the mounting frame 112 may have a mounting orifice extending therethrough. For example, the mounting frame 112 may include a forward mounting orifice 115 at a bottom end thereof and a rearward mounting orifice 116 at a top end thereof. The bracket may further comprise a mounting plate 114 extending substantially perpendicularly outward from an upper edge of the mounting frame 112, wherein the mounting plate 114 may have a bent elbow-like shape with an upper mounting orifice 111 extending therethrough. As shown in the Figures, a distal end of the mounting plate 114 may also have an upward angled lip. The bracket may further comprise a support frame 113 extending diagonally between a first surface of the mounting frame 112 and a bottom surface of the mounting plate 114, wherein the support frame 113 may include a supporting frame mounting orifice 117 aligned with the upper mounting orifice 111. As shown in FIG. 16, the mounting frame 112 may be mounted to side surfaces of the brake caliper 110 using fasteners 72 extending through the forward mounting hole 115 and the rearward mounting hole 116, and a light pod 22 may be mounted to the mounting plate 114 using a fastener extending through the upper mounting orifice 111 and the supporting frame mounting orifice 117.

While the above describes various potential brackets, it is understood that other shaped brackets are envisioned, depending on the specifics of the steering arm or mounting location. Moreover, the mount may be varied slightly depending on the axle used in the vehicle. In embodiments, the mount may be used with, for example, Dana 35 axles, Dana 44½ and ¾ ton axles, Dana 50 axles, Dana 60 ball joint and kingpin axles, Dana 70 axles, Dana 80 axles, Ford 9-inch axles, Chevy 14 bolt axles, Toyota truck axles, Suzuki Samurai axles, and independent front suspension vehicles.

To use the mount of the present disclosure, the bracket may be mounted to the steer arm/steering knuckle using a fastener, such as a bolt, and a nut. Alternatively, the bracket may be welded onto or incorporated into the body of the steering arm. A light pod 22 may then be mounted to the bracket by inserting a fastener, such as a bolt, extending from the light pod 22 through the bracket orifice and securing with a nut.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. An accessory mount for mounting an accessory to a steering arm on an axle, the accessory mount comprising:
   a bracket designed to attach to the steering arm, the bracket comprising:
      a mounting frame, wherein a first edge of the mounting frame is concavely curved and wherein a plurality of mounting orifices extend through the mounting frame; and
      a mounting plate extending substantially perpendicularly from an upper edge of the mounting frame, wherein the mounting plate has a mounting orifice extending therethrough, the mounting orifice being sized to accommodate a fastener extending from the accessory,
   wherein the bracket and, thus, the accessory rotate with rotation of the steering arm.

2. The accessory mount of claim 1, wherein the plurality of mounting orifices includes a forward mounting orifice and a rearward mounting orifice positioned at opposite ends of the mounting frame.

3. The accessory mount of claim 1, wherein the mounting plate tapers from the widest width proximate to a forward edge of the mounting frame to the smallest width proximate to a rear edge of the mounting frame.

4. The accessory mount of claim 1, wherein the mounting plate is substantially trapezoidal shaped.

5. The accessory mount of claim 1, further comprising a supporting frame extending diagonally between the mounting frame and the mounting plate.

6. The accessory mount of claim 5, wherein the supporting frame includes a supporting frame mounting orifice extending therethrough, the supporting frame mounting orifice aligned with the mounting orifice on the mounting plate.

7. The accessory mount of claim 1, wherein:
   the mounting frame comprises a first frame plate that is substantially planar and includes the curved edge and a second frame plate that extends substantially perpendicularly from a rearward edge of the first frame plate; and
   a frame cavity extends through a portion of both the first frame plate and the second frame.

8. The accessory mount of claim 7, wherein the mounting plate extends substantially perpendicularly from an upper edge of the second frame plate.

9. The accessory mount of claim 1, wherein the accessory is a light.

* * * * *